US009898941B2

(12) United States Patent
White

(10) Patent No.: US 9,898,941 B2
(45) Date of Patent: Feb. 20, 2018

(54) MODULAR FLUSH-MOUNT SIGN CHANNEL TRACK SYSTEM AND METHOD

(71) Applicant: Michael J. White, Ripon, WI (US)

(72) Inventor: Michael J. White, Ripon, WI (US)

(73) Assignee: K-International, Inc., Waukegan, IL (US)

( * ) Notice: Subject to any disclaimer, the term of this patent is extended or adjusted under 35 U.S.C. 154(b) by 0 days.

(21) Appl. No.: 14/756,762

(22) Filed: Oct. 9, 2015

(65) Prior Publication Data

US 2017/0103686 A1 Apr. 13, 2017

(51) Int. Cl.

*G09F 7/22* (2006.01)
*G09F 7/18* (2006.01)
*F16M 13/02* (2006.01)
*G09F 7/10* (2006.01)

(52) U.S. Cl.

CPC ............. *G09F 7/18* (2013.01); *F16M 13/027* (2013.01); *G09F 7/10* (2013.01); *G09F 2007/186* (2013.01); *G09F 2007/1847* (2013.01); *G09F 2007/1852* (2013.01)

(58) Field of Classification Search

CPC ........................................................ G09F 7/10
USPC .................... 40/617, 618; 248/317, 323, 327
See application file for complete search history.

(56) References Cited

U.S. PATENT DOCUMENTS 3,154,870 A * 11/1964 Hopp ........................ G09F 7/00 229/69
3,778,915 A * 12/1973 Freeman ................. G09F 13/20 40/605
4,262,436 A * 4/1981 Clement ................... G09F 3/20 40/490
4,357,773 A * 11/1982 Dennis ...................... G09F 7/02 40/606.18
4,434,570 A * 3/1984 Roos ......................... G09F 7/20 40/617
4,593,486 A * 6/1986 Visocky .................... G09F 3/20 40/490
4,641,448 A 2/1987 Cobb et al.
(Continued)

FOREIGN PATENT DOCUMENTS

FR 2936896 A1 4/2010
GB 2128011 A * 4/1984 ............... G09F 7/02

OTHER PUBLICATIONS

Hooked on Magnets, Website by Freedom's Design LLC, Copyright 2014, 2 pages.

*Primary Examiner* — Kimberly T Wood
(74) *Attorney, Agent, or Firm* — Schiff Hardin LLP

(57) ABSTRACT

A system and method for magnetically mounting a sign flush at a ceiling, window, or wall location that includes modular panels that are removably connected to one another to form a sign board stack. The sign board stack is mounted or unmounted from a prominent display location using a pole end gripper without the need for a ladder. The sign stack extends from a mounting strip having a holder at which the sign stack is fastened, and the gripper engages the mounting strip at an offset grasping portion disposed laterally of the holder. The panels have flanges at the top edge to fit into the holder of the mounting strip and clips at the bottom edge to hold a flange of a panel connected below it. Channel tracks are formed on the panels to hold strip sign elements, some of which may include accordion or spiral bound numbers or messages.

13 Claims, 7 Drawing Sheets

(56) References Cited

U.S. PATENT DOCUMENTS 4,698,928 A * 10/1987 Soporowski .............. G09F 7/08 40/605
4,884,351 A * 12/1989 Abramson .............. G09F 13/16 40/606.19
4,991,334 A * 2/1991 Amundsen ................ G09F 7/10 40/568
5,065,537 A * 11/1991 Bailey ....................... G09F 7/12 294/211
5,090,145 A * 2/1992 Chiang .................. A47G 1/065 40/605
5,188,332 A * 2/1993 Callas ....................... G09F 7/18 248/206.5
5,381,991 A 1/1995 Stocker
5,409,191 A * 4/1995 Wenmaekers .......... E04B 9/006 248/317
5,456,034 A 10/1995 Lewis et al.
5,588,238 A * 12/1996 Visocky .................... G09F 7/10 40/575
5,806,823 A * 9/1998 Callas ................... G09F 15/025 248/317
5,870,845 A * 2/1999 Ruderman ................ G09F 7/18 160/339
5,930,926 A * 8/1999 Kaplan ..................... G09F 7/10 40/124.4
6,048,010 A * 4/2000 Stocker ................... A47F 13/06 248/343
6,092,320 A * 7/2000 Bringuet ................... G09F 7/10 40/618
6,334,602 B1 1/2002 Clarke
6,435,464 B1 8/2002 Sullivan et al.
6,671,988 B2 * 1/2004 Cyrluk ...................... G09F 7/18 40/617
7,373,748 B2 * 5/2008 Pitcher ...................... G09F 7/00 24/462
7,823,311 B2 * 11/2010 Pitcher ...................... G09F 7/10 40/618
2004/0098895 A1 * 5/2004 Sparkowski .............. G09F 7/18 40/617
2006/0117630 A1 * 6/2006 Raia .......................... G09F 1/10 40/658

* cited by examiner

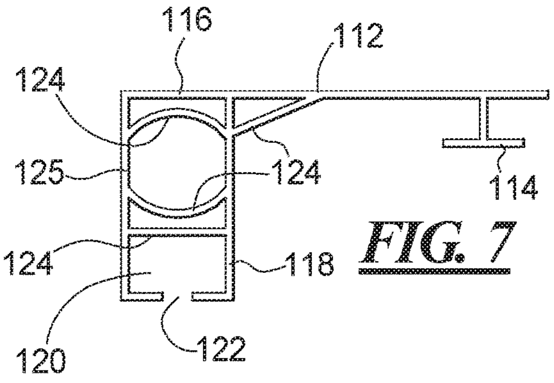
FIG. 7
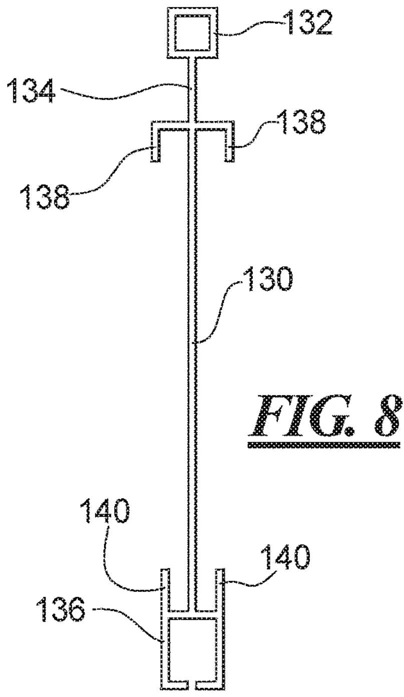
FIG. 8
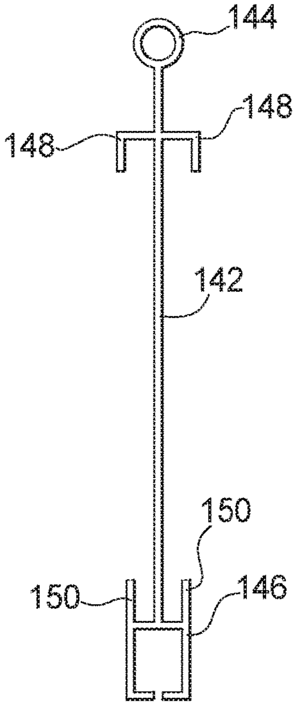
FIG. 9
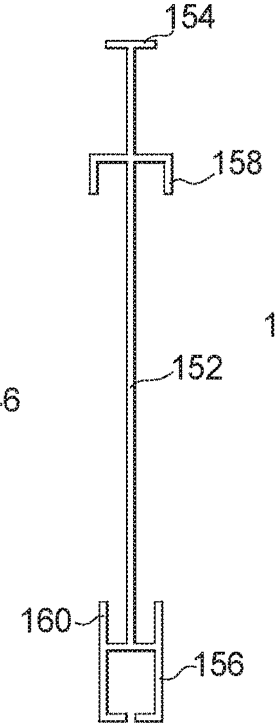
FIG. 10
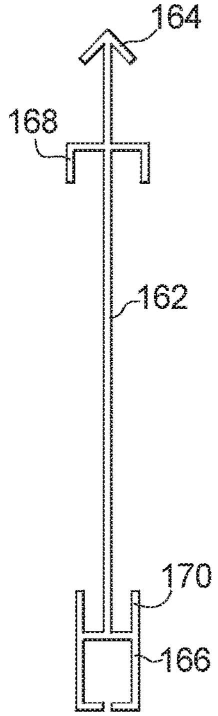
FIG. 11
FIG. 12
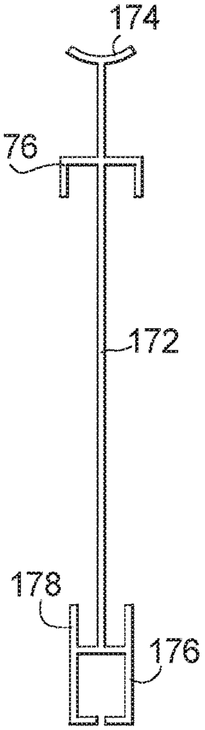

MODULAR FLUSH-MOUNT SIGN CHANNEL TRACK SYSTEM AND METHOD

BACKGROUND OF THE INVENTION

Field of the Invention

The present invention relates generally to a sign holder for interchangeable signs, and more particularly to a system and method for mounting signs that include interchangeable signs held in tracks or channels.

Description of the Related Art

Convenience stores, gas stations, markets, grocery stores, and other types of stores and shops may use signs that have interchangeable sign elements. One type of sign has a sign board on which are formed channels or tracks into which sign elements are inserted. A common sign element is a strip of cardboard, plastic or other material which has been printed with the desired text and image. The strip sign element is mounted on the sign board by sliding the strip sign element into the track or channel. Sign boards are provided that accept one, two, three, or more of the strip sign elements. The sign boards may have tracks or channels on one or both sides so that the strip sign elements may be displayed on just one side or on both sides of the sign board.

Sign boards that use strip sign elements mounted in channel tracks may be used to announce new products or sales on products. The sign boards may also be used as aisle indicators to list the items available in that aisle of the store. A grocery store may use the sign boards as way finding directories to mark the aisle for coffee, tea, and breakfast cereals, for example or a big box store may mark an aisle as school supplies and backpacks, for example. Convenience stores may use channel track signs to announce a sale price for a soft drink or a snack item. The strip sign elements are commonly used to advertise cigarettes, beer, lottery ticket sales, soft drinks and snack items. The sign boards containing strip sign elements may be used in new product promotional campaigns, to advertise sports fan apparel and products, school team apparel and products, or any number of other product, promotions or items.

Price information or other information may also be shown on the sign board as well. In one configuration, the price information or other message information is printed on cards, often as individual digits and symbols. The cards showing the digits and symbols may be inserted into the channel tracks next to one another to make up the price. Other information or messages may be provided on the cards as well. As just a few examples, the cards may be printed with a dollar sign, a cent sign, information such as “per case,” “24 oz. bottles,” “12 pack,” “each,” etc. Sets of the number cards may be spiral bound in a pack so that different numbers and information can be displayed by flipping the cards to reveal the desired number or information. The spiral bound card sets may be positioned next to one another after being flipped to the desired number to read, for example, “16 oz. cans $1.29 each” An alternate number set is a strip on which the numbers or other information has been printed. The strip is accordion folded so that a desired number or message may be revealed by changing the folded position of the strip. Channel tracks for holding spiral bound number sets or accordion folded number sets are formed to accommodate the greater thickness of the spiral bound or accordion folded number sets within the sign board tracks.

The number sets may be used with the strip sign elements in the same sign board channel track. For example, the strip sign element may be inserted in the channel strip of the sign board to show a soft drink or other product or its logo and the price information for that product may be provided by assembling the number sets in the same channel in front of the strip sign element so that the price appears with the illustration or logo of the product.

Common configurations of sign boards are formed of a single sheet of plastic on which has been provided several of the channel tracks. For example, a sign board may include three channel tracks on each side configured for receiving the strip sign elements and a fourth channel track configured for receiving number sets, either alone or with a strip sign element. The sign boards are generally formed as a continuous sheet in a specifically designed configuration or profile by extrusion. A multiple track sign board is large for an extruded part, requiring that the extruder device be operated slowly to ensure correct formation of the specifically designed sign board configuration. As a result, the specifically designed multiple track sign board may be time consuming and expensive to produce.

Multiple track sign boards are large, the result of which is that shipping of the large sign boards may be expensive. The large sign boards are also more prone to damage during shipping. A large multiple track sign board occupies a significant amount of space when stored. It is also prone to damage during storage due to its large size.

If a store has a three track sign board, for example, it could not be used to announce a sale on four items or to mark an aisle with five types of products, and so the store might be required to obtain a different extruded sign board for each desired presentation. A store with a four track sign board that would like to announce only two items, for example, may choose to get a different two track sign board for the new sale, or to use the existing sign board and leave two tracks empty—a less desirable option. It may be necessary for the store to obtain and keep a number of different sign boards having different numbers of tracks or channels to accommodate the different strip sign element circumstances encountered.

If the store has a sign board having, for example, two channel tracks for strip signs and one channel track for spiral bound number sets, it will not be possible for the store to use the sign board to hold two or three different prices using spiral bound number sets. It may be necessary for the store to obtain a completely different sign board to provide the desired display. Not only must the number of channel tracks match the desired strip sign displays, but the number of sign strip channels and the number of number set channels must agree with that desired for display. Store personnel may find that unfortunately the sign board that the store has available for use may fail to meet the immediate need.

SUMMARY OF THE INVENTION

The present invention provides a modular channel track sign board that permits channel tracks to be added and removed as desired. A channel and/or track sign board may be customized to provide a different size, style or number of channel tracks according to the immediate needs of the user. Not only are the sizes, styles and number of channel tracks customizable, but the number and location of the number set tracks relative to the number and location of the sign strip channel tracks may be arranged as desired. Taller channel tracks for larger height strip sign elements may be interchanged with shorter height channel tracks for smaller strip sign elements.

The modular channel tracks may be separated into individual panels which are smaller than multiple track sign boards. As a result, the modular channel tracks are quicker and less expensive to form by extrusion, they are less expensive to ship and less prone to damage during shipping, they occupy less space when stored and are also less prone to damage when stored. The modular sign channel tracks may be assembled, reconfigured and customized directly at the store location as desired, so that the modular sign channel track may replace a number of different, single configuration sign boards. This further reduces the storage room and expense, as well as eliminating the shipping costs for obtaining alternative specific purpose sign board configurations.

Not only is a modular sign board system provided, but the sign board system may be mounted using an offset ladderless mounting apparatus with no need for additional sign hanging hardware. The mounting apparatus permits the sign board to be mounted flush and tight to the ceiling, for example, so that the sign surface area may be maximized while still providing head room for customers and clear lines of sight visibility for store personnel to assist in shoplifting prevention. Stores with lower ceilings, which may be more common in convenience stores and gas stations, may now use the multiple channel sign boards mounted tight to the ceiling where such signs were not possible before or additional sign hanging hardware was required.

The offset ladderless mounting apparatus includes a mounting pole end gripper that permits the sign to be mounted at the desired mounting location and removed from the mounting location without requiring a ladder, step stool, chair, or other object for the user to climb on to reach the desired mounting location. There is no need to bring a ladder into the store to change the sign and no need for the store personnel to risk falling or other injury to change the sign.

BRIEF DESCRIPTION OF THE DRAWINGS

FIG. 7 is an end view of an alternate mounting strip;

FIG. 8 is an end view of a first alternate panel for use with the mounting strip of FIG. 7;

FIG. 9 is an end view of a second alternate panel for use with the mounting strip of FIG. 7;

FIG. 10 is an end view of a third alternate panel for use with the mounting strip of FIG. 7;

FIG. 11 is an end view of a fourth alternate panel for use with the mounting strip of FIG. 7; and FIG. 12 is an end view of a fifth alternate panel for use with the mounting strip of FIG. 7.

DETAILED DESCRIPTION OF THE PREFERRED EMBODIMENTS

Figure 1:
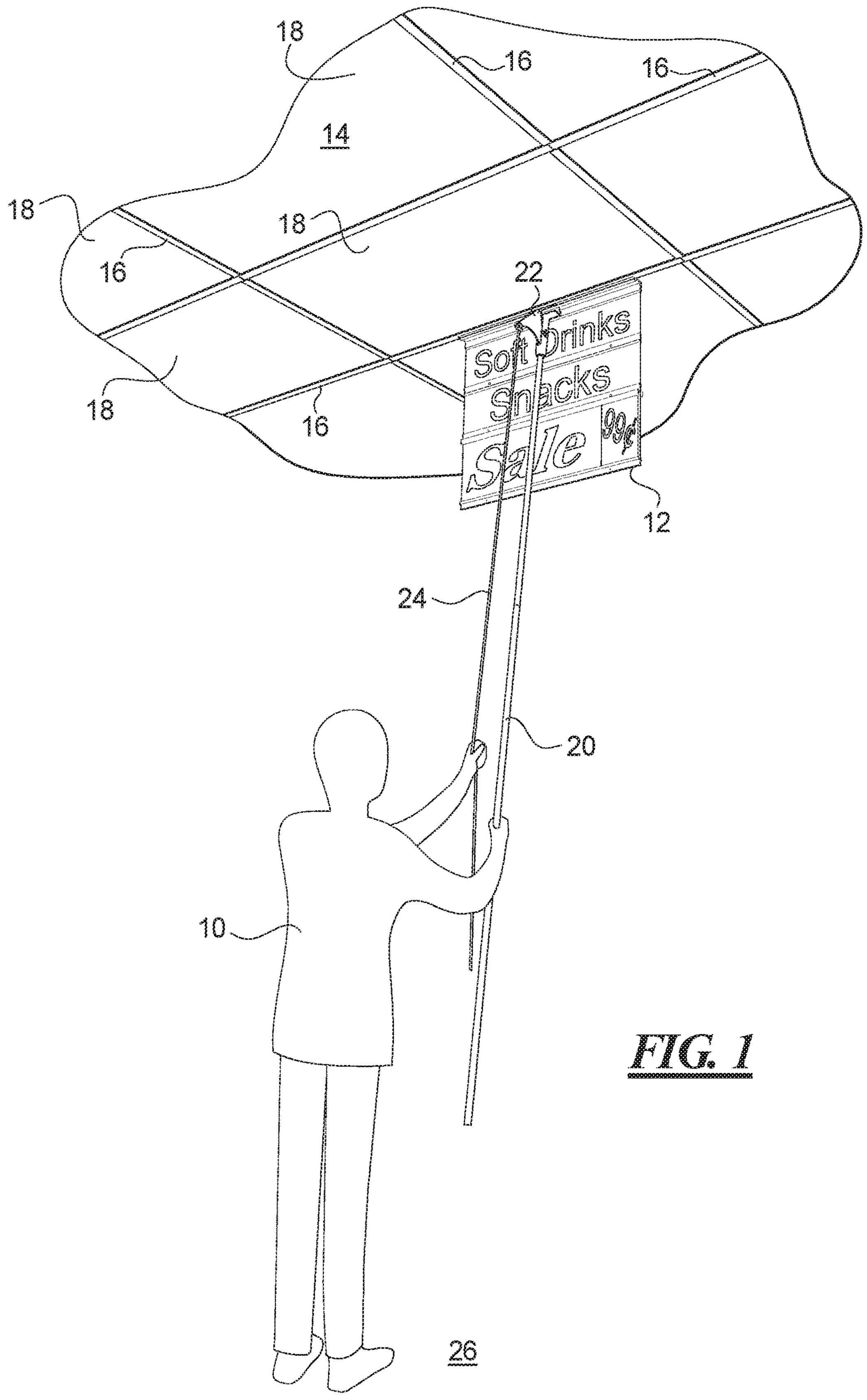
FIG. 1 is a perspective view of a person mounting or unmounting a sign according to principles of the present invention.

In FIG. 1, a person 10 is mounting or unmounting a sign 12 at a ceiling 14. The sign 12 is being connected to or removed from a grid member 16. The grid member 16 is one of several grid members 16 that hold ceiling tiles 18. The grid member 16 is magnetically attractive, such as being formed of a ferromagnetic material, so that a magnet may attach to the grid member 16. To mount or unmount the sign 12 at the ceiling 14 without using a ladder or other object to climb on, the user 10 is holding a pole 20 that has a gripper 22 at the end. The gripper 22 holds the sign 12 as the user moves the sign 12 to a position at the ceiling 14. The gripper 22 includes a rope or cord 24 that extends from the gripper 22 to a position where the person 10 may pull on the rope or cord 24 to release the gripper 22 from the sign 12 when at the mounting position. The sign is positioned at and mounted to the grid member 16 while the person's feet remain on the floor 26. This may be accomplished regardless of the height of the person 10 or the height of the ceiling 14 from the floor 26. A longer pole or an extendable pole may be provided for higher ceilings or where desired.

Removal of the sign 12 from the ceiling 14, such as after the sale has ended or to change display elements in the sign, may be accomplished while the person's feet remain on the floor 26. The person moves the pole 20 so that the gripper 22 is at the sign 12, and in particular at a gripping portion of the sign 12. The person 10 pulls on the rope or cord 24 to open the gripper 22 and moves the gripper to an engagement portion of the sign. The person 10 releases the pulling force on the rope or cord 24 which causes the gripper 22 to engage the sign 12. The sign 12 may be removed from the grid member 16 or may be moved to a different location or orientation on the grid member 16. The removal may be for changing and remounting the sign or to display, for example, a new or different product, a new or different sale, a different product location in the store or other facility, or for other reasons.

The sign 12 includes display space that extends flush to or nearly flush to the ceiling 14. Display space is not lost by requiring that the sign hang a distance below the ceiling to permit the sign to be mounted and unmounted. The sign 12 at the ceiling 14 is prominently positioned for viewing by customers, for example, yet may be high enough above the floor 26 to provide head clearance for even tall persons in the store or other facility. The sign 12 is also high enough to provide line-of-sight visibility around the store or facility for security purposes, such as to deter shop lifting or theft. By positioning the sign flush to the ceiling 14, the size of the sign 12 may be increased compared to signs that require hanging hardware to hang a distance below the ceiling, without violating head clearance needs or blocking visibility for security. This is particularly so for stores, gas stations, convenience shops, boutiques, and other facilities that may have lower ceilings and thus limited height for displaying ceiling mounted signs.

The store or facility may have a plaster ceiling or other ceiling type that does not have a grid member 16 to which to attach the sign 12. Metal plates (not shown) or metal strips may be mounted flush to the ceiling 14 by anchoring, for example, to provide a magnetically attractive mounting location for the sign. Examples of metal plates are shown in pending application Ser. No. 14/248,899, filed Apr. 9, 2014, which is entitled SYSTEM AND METHOD FOR LADDERLESS DISPLAY MOUNTING AND UNMOUNTING, which is incorporated herein by reference. The sign 12 may be mounted using a rotatable mounting strip or using hooks, both of which are shown in the pending application Ser. No. 14/248,899. The sign 12 may be mounted in windows such as by attachment to a window frame using the mounting system and process described herein. For window frames that are not magnetically attractive, a metal strip or other metal elements may be affixed to the window frame to provide a mounting location for the sign 12. The metal strip may be adhesively fastened to the window frame or other surface, for example.

Other mounting means for the sign 12 are also envisioned and within the scope of this patent. For example, the sign 12 may be mounted using a track and cleat system. Examples of track and cleat mounting by which mounting of the modular sign as shown herein may be accomplished as shown in pending patent application Ser. No. 14/664,154, filed Mar. 20, 2015, entitled LADDERLESS CLEAT AND TRACK BANNER HANGER FOR VERTICAL SURFACE, which is incorporated herein by reference.

Figure 2:
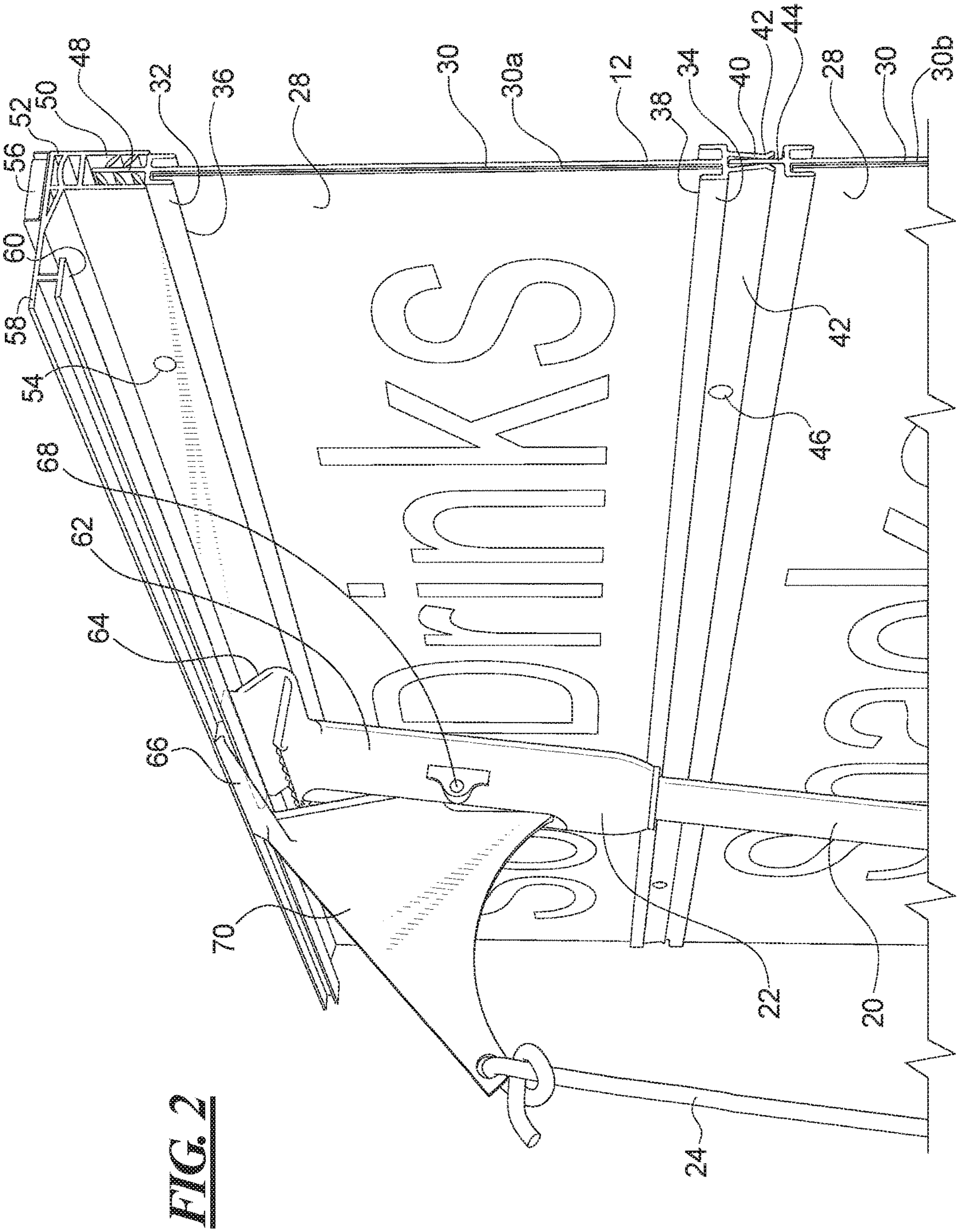
FIG. 2 is an enlarged perspective view of the sign and mounting system.

Turning to FIG. 2, the sign 12 is held in the gripper 22 mounted on the pole 20. The sign 12 includes display strips 28 for mounting on panels 30. The display strips 28 may be pre-printed strips of heavy paper, cardboard, plastic or other material that is to be displayed. Examples of information on the display strips 28 include product names, product logos, photographs or graphics showing products or other information, aisle identifier information, product categories or product types, store name or store information, sale information, price information, store hours, holiday information or images or products, promotional information, special announcements, and countless other information. The display strips 28 may be readily exchanged in the panels 30.

The illustration of FIG. 2 shows two panels 30 holding the display strips 28 with product type information, here "soft drinks" and "snacks" are printed on the strips 28. This sign may be placed over an aisle containing soft drinks and snacks, or may be placed at a prominent location within the store to announce the availability of these products. The sign 12 accommodates display strips 28 on both sides of the sign.

The panels 30 each include an upper channel 32 and a lower channel 34. The upper channel 32 extends outward from the panel 30 and then includes a portion extending downward to define a channel track 36 that is open from below. The lower channel 34 includes a portion that extends outward from the panel 30 and a portion that extends upward to define a channel track 38 that is open from the top. The channel tracks 36 and 38 are directed toward one another. The display strip 28 is held onto the panel 30 by upper and lower edges of the display strip 28 extending into the channel tracks 36 and 38.

An upper panel 30*a* has a clip 40 along the lower edge in the illustrated embodiment. The clip 40 is formed by two inwardly angled strips 42 that define a space between them. A lower panel 3*b* has a flange 44 at its upper edge in the illustrated embodiment. The flange 44 extends into the space between the angled strips 42 to hold the lower panel 30*b* to the upper panel 30*a*. The lower panel 30*b* may be removed from the upper panel 30*a* or attached as desired. A pin 46 is inserted into the clip 40 and the flange 44 to ensure that the panels 30*a* and 30*b* are secured together.

The upper panel 30*a* has a flange 48 at its upper edge. The flange 48 extends into a holder 50 of a mounting strip 52. Details of the holder 50 will be described with reference to other drawings. A pin 54 is inserted into the holder 50 and through the flange 48 to hold the upper panel 30*a* to the mounting strip. The mounting strip 52 includes a magnet 56 at a top surface of the mounting strip 52 by which the mounting strip 52 is magnetically attached to the grid members 16 of the ceiling 14 or to metal plates or other magnetically active mounting sites. An offset grasping portion 58 extends laterally from the mounting strip 52. The offset grasping portion 58 includes a downward extending projection 60 having an inverted T shape. The downwardly extending projection 60 is shaped to permit engagement by the gripper 22. The lateral position of the downward extending projection 60 permits the mounting strip 52 to be engaged and moved by the gripper 22 without requiring a space between the mounting strip 52 and a sign mounted below the mounting strip 52.

The gripper 22 is mounted on the pole 20 by a gripper body 62. At the end of the gripper body 62 is a stationary jaw 64. A movable jaw 66 is mounted in the gripper body 62 by a pivot 68. A spring (not shown) is mounted within the gripper body 62 to bias the movable jaw 66 to a closed position against the stationary jaw 64. An extension 70 is provided on the movable jaw 66. The rope or cord 24 is connected to the extension 70. By exerting a pulling force on the rope or cord 24, the user is able to open the movable jaw 66 by moving the jaw 66 away from the stationary jaw 64 to permit the jaws 66 and 64 to grasp the downward extending projection 60. The pulling force is released and the jaws 66 and 64 close. Once the mounting strip 52 is grasped in this way, it may be moved using the pole 20 and gripper 22. The gripper 22 may grasp and hold the mounting strip 52 while the signs that are mounted therein extend flush to the ceiling 14. As described elsewhere in this specification, the gripper 22 may also release the mounting strip 52 while at the ceiling 14 without requiring a space between the mounting strip 52 and sign in a flush-to-the-ceiling manor.

Figure 3:
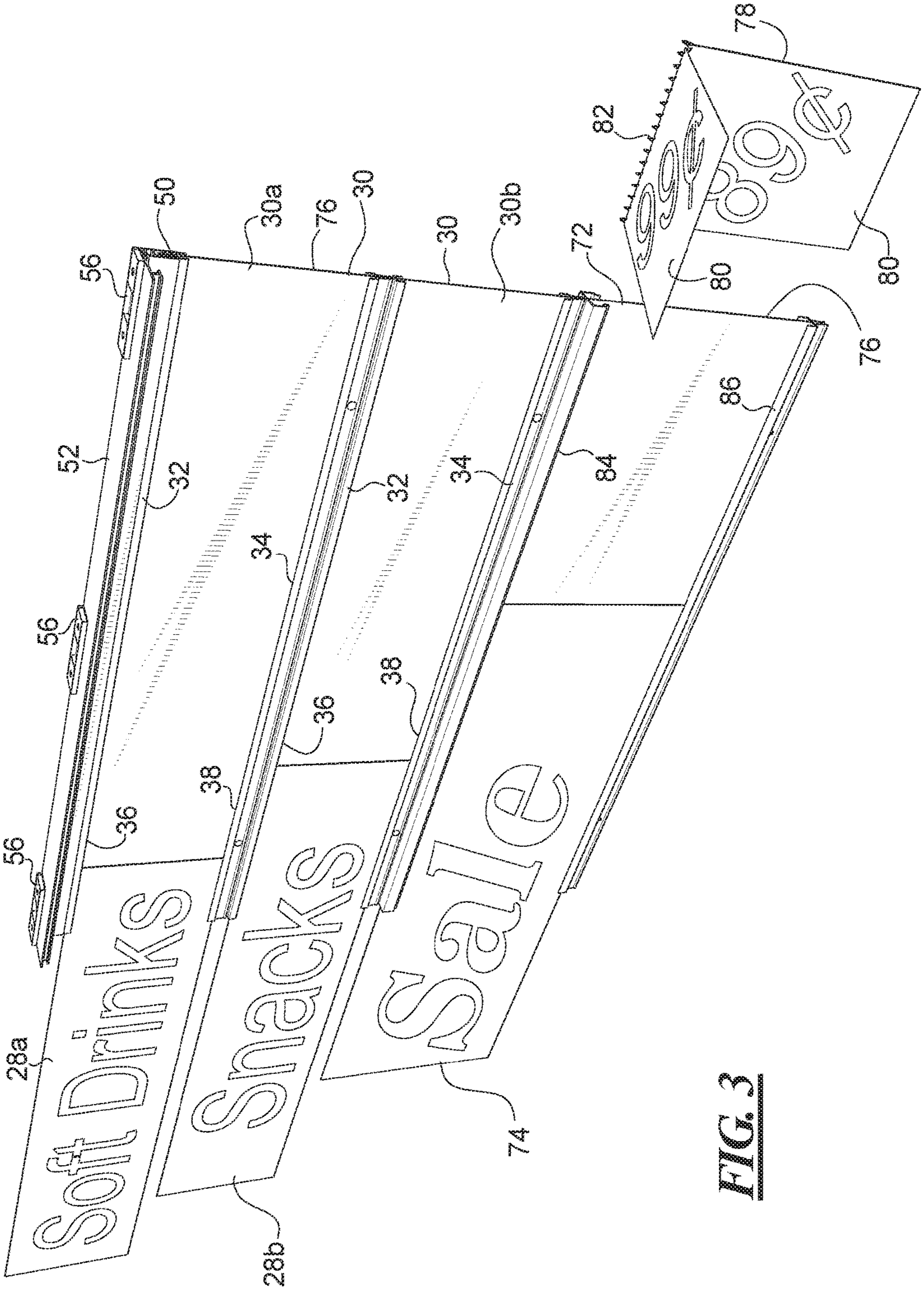
FIG. 3 is a perspective view showing the sign and mounting system.

FIG. 3 shows an example of a modular sign. At the top is the mounting strip 52. The mounting strip 52 has three magnets 56 mounted on a top surface. The magnets 56 of the illustrated embodiment each include two ceramic magnet elements within a metal channel. Other configurations or numbers of magnets may be provided as desired. In an alternate embodiment, the magnets 56 may be mounted on the back side of the mounting strip 52 so that mounting strip 52 may be mounted to a wall, window frame edge, or other vertical surface. The mounting strip 52 has the upper panel 30*a* mounted in the holder 50. The upper panel 30*a* has the display strip 28*a* being slid into the channel tracks 36 and 38 formed by the upper and lower channels 32 and 34. The display strip 28*a* may be changed as desired to show any product or information. In an example of the display strip 28*a*, the strip has a height of approximately 5.5 inches and a length of approximately 26 inches. Other sizes and dimensions are of course possible.

The lower panel 30*b* is connected to the upper panel 30*a* in the illustration. The panels 30 may be connected or disconnected as desired. The lower panel 30*b* also has an upper channel 32 and lower channel 34 forming channel tracks 36 and 38 that are directed toward one another. A display strip 28*b* is being inserted into the channel tracks 36 and 38. In the illustrated example, the panel 30*b* has approximately the same dimensions as the panel 30*a* and the display strip 28*b* is of approximately the same size. It is also possible that the panels could be of different sizes to accommodate display strips of different sizes. For example, the panels 30 and display strips 28 may be different sizes in a height direction so that a short sign or display strip and a tall sign or display strip are mounted in the corresponding panels.

In this example, a third panel 72 is attached to the other panels 30. The third panel 72 is connected to the lower panel 30*b* in the same way that the lower panel 30*b* is connected to the upper panel 30*a*. The third panel 72 is shaped to accept a taller display strip 74. The illustrated example shows the display strip 74 of approximately 8 inches in height. Other sizes can of course be provided. The assembled panels 30*a*, 30*b* and 72 are an example of a sign stack 76. The sign stack 76 may include any arrangement of shorter and taller panels 30, 72 holding shorter or taller display strips 28, 74 as desired. The modular panels permit the number of panels connected to one another to be increased or decreased and the arrangement of the panels to be changed.

The panels 30, 72 may all be configured to hold only flat display strips or may be configured to hold additional display elements. In FIG. 3, a spiral bound pad 78 is provided with pre-printed information that may be displayed in the sign 12. The spiral bound pad 78 includes several pages 80 bound by a spiral binding 82. When removed from the sign 12, the pages 80 of the spiral bound pad 78 may be flipped to reveal the desired information. Once the desired information is on the front page 80, the spiral bound pad 78 is inserted into channel tracks 84 and 86 on the third panel 72, which are configured to accept the spiral bound pad 78. The spiral bound pad 78 may be inserted in front of the display strip 74. If the user desires to have the spiral bound pad 78 at the top of the sign, the modular panels are separated and re-assembled in the desired way. If the user desires to have several of the panels of the sign stack with the spiral bound pad information, the panels that accommodate the pads 78 may be included in the sign stack 76 as desired. The panel 72 that accepts the spiral bound pad 78 is shown as taller than the other panels 30. Panels 72 that are shorter or taller and accept the pads 78 are also possible.

The spiral bound pad 78 may include price information, including several digits per page or single digits and/or symbols per page that are assembled side-by-side with other pads to provide price information, for example. Other information may be provided on the pre-printed spiral bound pads, such as "per pack," "per case," "12 oz. bottles," etc. The pads need not be spiral bound. Some pre-printed pads are accordion folded or otherwise constructed to permit the pages to be displayed in a sign. Other pads or price cards are possible.

In the embodiment of FIG. 3, the mounting strip 52 and the panels 30 are of approximately the same length and are connected to one another with the ends aligned with one another. The display strips 28 that make up the sign are also generally of the same length and are inserted into the channel tracks in the panels 30 so that the ends of the display strips 28 align with the ends of the panels 30. It is possible in some embodiments and in some installations that the mounting strip, panels, and display strips may be of different lengths. It is also possible that the mounting strip, panels and display strips may be assembled so that the respective ends are out of alignment with one another.

Figure 4:
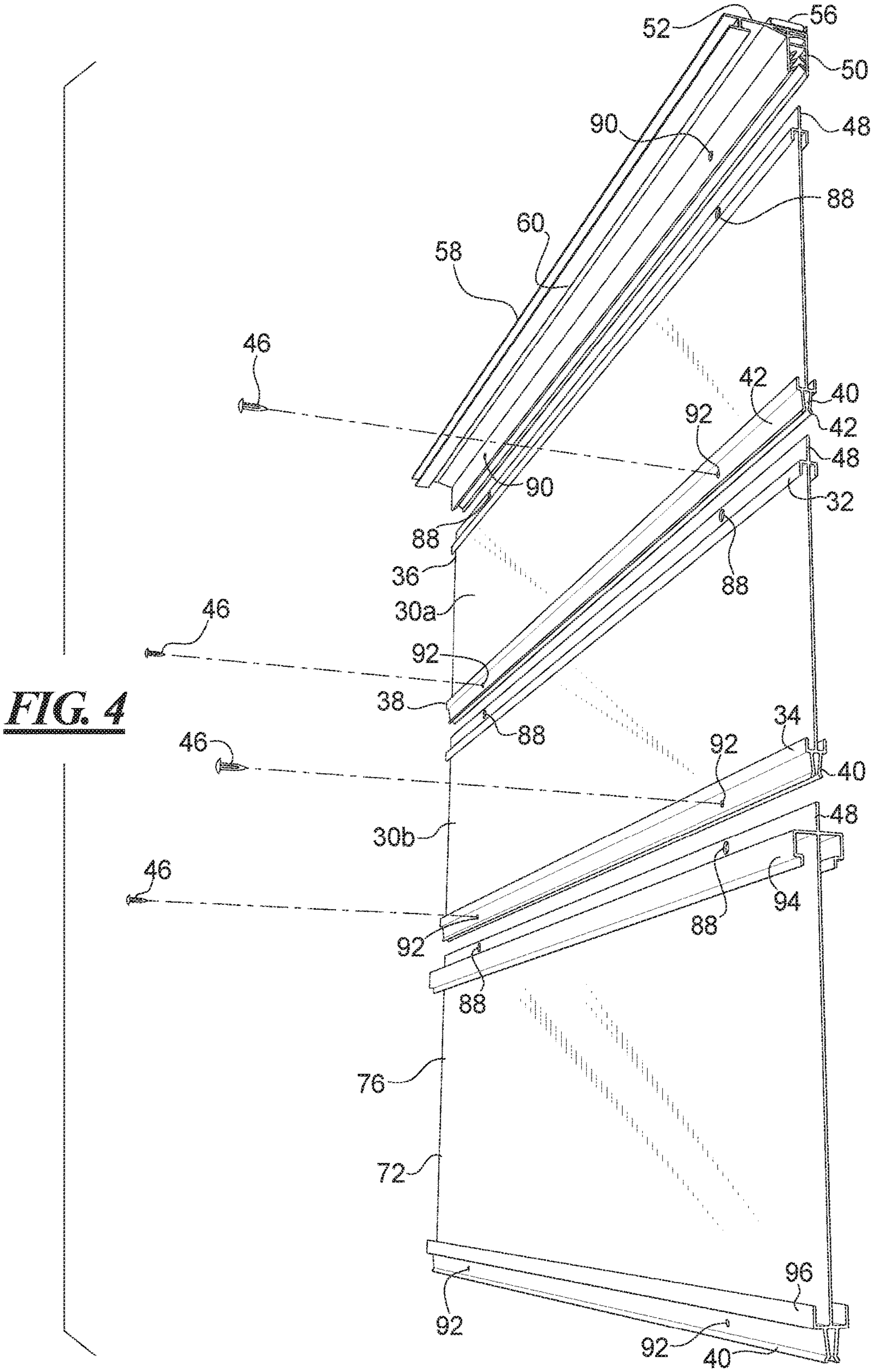
FIG. 4 is an exploded view showing the assembly of components of the sign mounting system.

Turning to FIG. 4, the modular ladderless sign channel track system is shown. To mount the sign 12 at the ceiling 14 using the gripper 22, the mounting strip 52 is provided at the top. A first panel 30*a* to be mounted closest to the ceiling 14 is attached to the mounting strip 52 by inserting the flange 48 into the holder 50. The holder 50 is configured to securely hold the sign stack 76 without requiring further fasteners. It may be desired in some embodiments to provide pins 46 through aligned holes 88 and 90 in the flange 48 and holder 50. If the single panel 30*a* is sufficient for the user's needs, the display strip 28 may be inserted into the channel tracks 36 and 38 of the panel 30*a* and the resulting sign flush mounted at a display location.

If the user wishes to include a second display strip 28 in the sign stack 76, the lower panel 30*b* is connected to the upper panel 30*a*. The connection is accomplished inserting the flange 48 of the lower panel 30*b* into the clip 40 of the upper panel 30*a*. The inwardly angled strips 42 of the clip 40 of certain embodiments exert sufficient force to hold the panels 30*a* and 30*b* together. The user may desire to further secure the panels 30*a* and 30*b* together by inserting pins 46 into aligned holes 88 and 92 in the flange 48 and the clip 40, respectively. A further display strip 28 is mounted in the lower panel 30*b*. The person 10 may flush mount the sign 12 with two panels in the sign stack 76 at a display location.

In the illustrated example, the user has elected to add a third panel 72 to the sign stack 76. The third panel 72 has a top flange 48 that fits into the clip 40 of the lower panel 30*b*. The panels 30*b* and 72 may be fastened only by the force of the clip 40 or may be provided with additional fasteners in the form of the pins 46 that extend through aligned holes 88 and 92. If the user wished, a fourth, fifth, sixth, and possibly more panels, either single sided or double sided, may be connected together in this modular system to provide as much information and sign space as desired.

The pins 46 may be removable pins, for example of a plastic material such as nylon. The pins 46 extend through aligned holes 88, 90 and 92 in the assembled parts. The holes 88, 90 and 92 may be provided in any location or position desired. In certain examples, the holes are formed four inches in from each end of each component of the modular system.

The third panel 72 has an upper channel 94 that is configured to accept the spiral binding 82 of the spiral bound pad 78. The third panel 72 has a lower channel 96 that accommodates the stacked pages 80 of the spiral bound pad 78.

The illustrated panels 30*a* and 30*b* and 72 have the same configuration of channels 32, 34, 94 and 96 on both sides of each panel. It is within the scope of this invention that the channels may be provided on only one side or that different channels may be provided on the opposite sides of the panel.

The mounting strip 52 and the panels 30 and 72 are formed of plastic by extrusion. The extrusions generally have the same profile from one end to another. The manufacture of each panel for each display strip as individual panels makes for smaller extrusions, which simplifies and speeds up the manufacturing process. The possibility to provide separated panels for shipping and storage requires smaller boxes for shipping, which reduces shipping costs and storage costs as well as reduces the risks of damage during shipping and storage. The possibility for configuring the sign as desired avoids the need for purchasing and stocking multiple sign panels of different configurations. For the manufacturer, fewer tools (extrusion forms) are required. The panel may be formed by a given tool regardless of where the panel is to be used in the sign stack. It is no longer necessary for the manufacturer to have tools (extrusion forms) to make two panel signs, three panel signs, four panel signs, etc. or to have a sign with the price under the sign, the price over the sign, the price below two signs, the price above two signs, etc.

Figure 5:
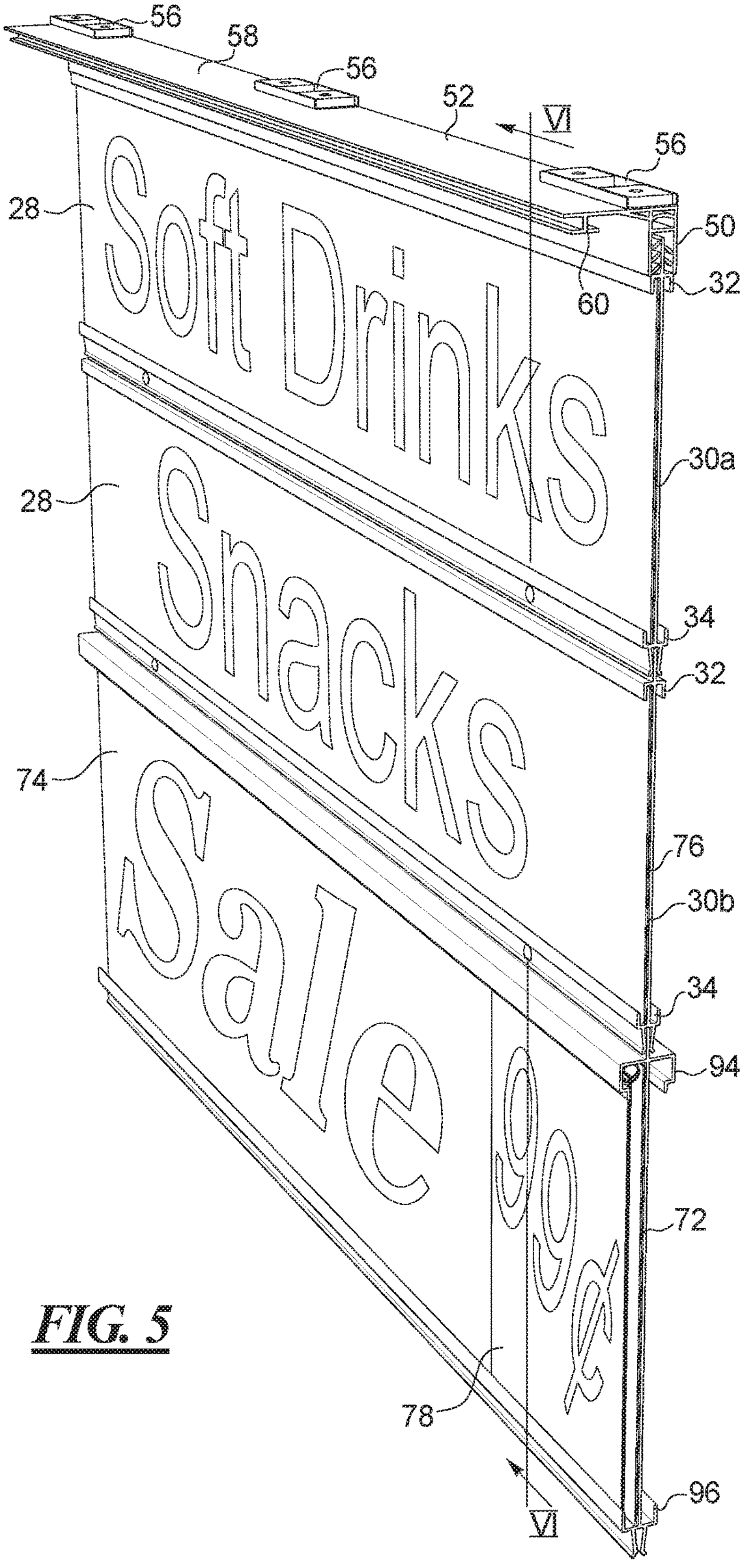
FIG. 5 is a side perspective view showing the assembled sign mounting system.

FIG. 5 shows the sign stack 76 of one example. The panels 30*a* and 30*b* are connected at the top two positions in the sign stack 76. The panel 72 is provided at the lower most position in the sign stack 76. The panels 30*a* and 30*b* are provided with the shorter display strips 28 in the channel tracks. The panel 72 is provided with the taller display strip 74 in the upper and lower channels 94 and 96. In addition, the spiral bound pad 78 is inserted into the upper and lower channels 94 and 96 in front of a portion of the display strip 74. Cross section line VI-VI is marked in FIG. 5.

Figure 6:
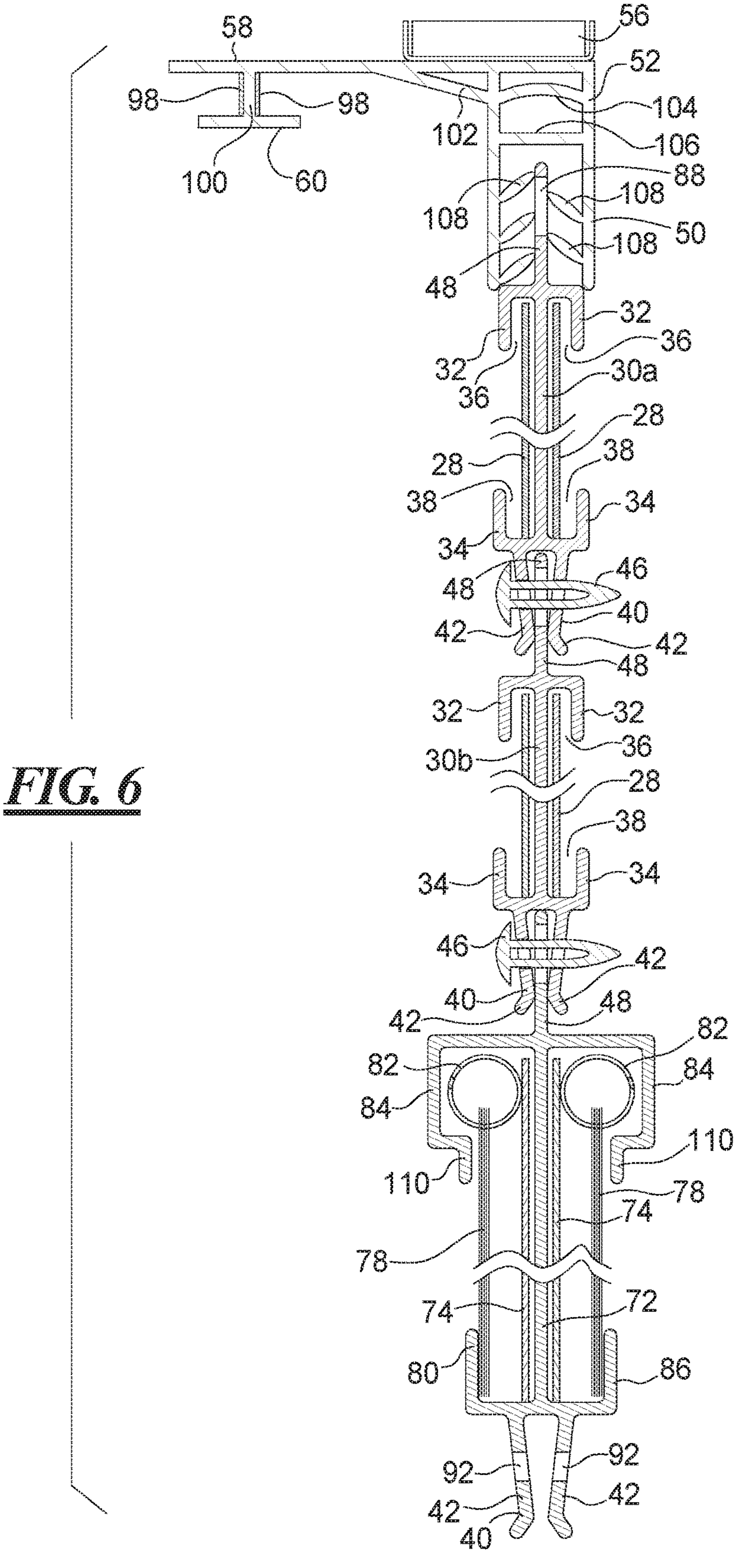
FIG. 6 is a cross-sectional view, partially broken away, of the assembled sign mounting system of FIG. 5 taken along line VI-VI.

In FIG. 6 is shown the cross section along line VI-VI. Beginning at the top, the assembled modular display system includes the magnet 56 mounted on the mounting strip 52. The mounting strip 52 has the offset grasping portion 58 extending laterally and supporting the downwardly extending projection 60. The projection 60 includes soft vinyl strips 98 on both sides of a neck 100 at which the gripper jaws 64 and 66 engage. The gripper jaws 64 and 66 are prevented from slipping by the soft vinyl strips 98. The mounting strip 52 includes reinforcing ribs 102, 104 and 106 to strengthen the mounting strip 52. The holder 50 is formed of first and second wall portions defining a capture space between them. The wall portions have several inwardly directed flexible ribs 108 that bear against the flange 48 to hold the panel 30 in the mounting strip 52. The illustrated example includes five such ribs 108, although other numbers of ribs or other first and second wall portion shapes and styles may be provided. The holder 50 may optionally be provided with pins 46 extending through holes to fasten the flange 48 into the holder 50.

The flange 48 extends upward from the panel 30*a*. Immediately below the flange 48 are the upper channels 32 on both sides of the panel 30. The upper channels 32 define channel tracks 36 that engage upper edges of the display strips 28. Lower edges of the display strips 28 are held in the channel tracks 38 formed by the lower channels 34. Extending from the lower channels 34 are the inwardly angled strips 42 that form the clip 40. The strips 42 need not be inwardly angled in every instance, particularly if a pin 46 or other fastener will be used. The free ends of the inwardly angled strips 42 are angled outwardly to more easily accept the flange 48 of the next lower panel 30*b*.

The next lower panel 30*b* has its flange 48 inserted into the clip 40 of the panel 30*a* above it. A pin 46 extends through the aligned holes in the clip 40 and flange 48. The pin 46 includes a split pin shaft that holds the pin 46 in place but permits the pin 46 to be removed when the user desires to separate the panels 30. Like the panel 30*a* above it, the panel 30*b* has upper and lower channels 32 and 34 that hold the display strips 28 in channel tracks 36 and 38. The lower edge of the panel 30*b* has a clip 40 formed in the same way as the clip of the panel 30*a* above.

The lower most or third panel 72 has its flange 48 extending into the clip 40 of the panel 30*b* above it. A pin 46 secures the panels 30*b* and 72 together. Below the flange 48 is the upper channel track 84 that is of sufficient size to accept the display strip 74 and the spiral bound pad 78. The spiral binding 82 fits into the upper channel track 84. An inwardly directed portion 110 engaged beneath the spiral binding 82 is to help prevent the spiral binding 82 from coming out of the channel track 84 except at the end. The lower channel track 86 extends far enough from the panel 72 to accept both the pages 80 of the spiral bound pad 78 and the display strip 74. The channel tracks 84 and 86 will accept other pads or cards of pre-printed information, such as accordion folded pads or the like. The lower channel tracks 86 are connected to inwardly angled strips 42 that form a clip 40 on the lower edge of the panel 72. Openings 92 are shown in the inwardly angled strips 42 into which a pin 46 may be inserted.

It is contemplated that the channel track 84 may be sufficiently flexible to accept the spiral bound pad 78 directly into the upper channel track 84 from below rather than having to slide the spiral bound pad into the channel track in at the ends. A further panel (not shown) may be connected to the clip 40 of the third panel 72. Additional panels may be connected below that. The configurations of the panels in the sign stack 76 may vary as desired by the user.

The openings 88 in the flanges 48 are preferably of a larger diameter than the openings 90 and 92 in the holder 50 and the clips 40. The opening size difference permits easier fastening of the pins 46. In certain embodiments, the openings 88 in the flanges 48 are of twice the diameter of the openings 90 and 92 in the holder 50 and clips 40. Other shapes or other size openings are also possible.

In the drawing Figures, the larger panel that accepts the spiral bound price pad is the lower panel in the sign stack 76. It is possible that the panel for holding the price pad may be provided at the top panel of the stack, or in the middle, or at some other position. It is possible that several or all panels in the sign stack are configured to accept price pads, or that all panels are for flat display strips only or may be single sided or double sided as shown.

Although two sizes of panels are shown, the panels may be provided in a variety of different sizes to accept different heights of display strips. Examples of possible sizes include panels to accept three inch high display strips, four inch high display strips, five inch high display strips, six inch high display strips, seven inch high display strips, and eight inch high display strips. Of course, other sizes are possible.

Even if the configuration of the sign stack is to remain the same, the ladderless mounting and unmounting of the sign 12 simplifies the changing of the sign message and eliminates the need to bring a ladder into the store to make the change. The chance of damaging store fixtures and merchandise as the ladder is brought into and out of the store and set up in what may be narrow aisles and closely spaced fixtures is eliminated. Signs can be changed with less hassle and may be kept up-to-date by changing the signs frequently by store associates while safely standing on the floor.

The panels may be connected to one another by a variety of connectors including C-shaped channels at the lower edge into which is received various shaped upper edge connection members. For example, the upper edges may be provided with horizontal rods, tubes, or plates that slide into horizontal channels of the adjoining panel.

The panels are shown as receiving pre-printed display strips, but other display types may be provided. For example, one or more of the panels may be provided as a chalk board. The sign 12 may display store director or way finder information, menu items, aisle identification information, or the like.

The modular panels 30 and 72 may be used with the mounting strip 52 or may be used separately, such as by mounting the sign using hooks, rings, cable, or chain, or other mounting means.

An alternate mounting strip 112 is shown in FIG. 7. The mounting strip 112 includes an offset grasping portion 114 and a top surface 116 and a back surface 125 on which to mount magnets. In place of the holder 50, the alternate mounting strip 112 includes a C-channel 118 defining an elongated space 120 into which a connection portion of a panel may be inserted. The C-channel 118 of the illustrated embodiment is generally rectangular in cross-section with an open slot 122 at a lower surface. Braces 124 are provided to strengthen and reinforce the mounting strip 112. Other shapes of "C" channels are of course possible. The holder 50 of the embodiment of FIGS. 2-6 and the C-channel of FIG. 7 illustrate the diversity of possible attachment structures possible, all of which are within the scope of this patent.

FIG. 8 is an end view of a first alternative panel 130. The panel 130 has a connector portion 132 extending along its top edge. The connector portion 132 is shaped to fit into the elongated space 120 in the channel 118. In the illustrated embodiment, the connector portion 132 has a generally rectangular shape in cross section and is of a smaller size in height and width than the elongated space 120 so that the connector portion 132 may be slid into the elongated space 120 in the mounting strip 112 from the end of the mounting strip 112. A neck 134 extends from the connector portion 132 to the body of the panel 130. The neck 134 passes through the slot 122 when the panel 130 is assembled in the mounting strip 112. The lower edge of the panel 130 includes a C-channel 136 that is similar in size and shape to the C-channel 118 of the mounting strip 112. The C-channel 136 accepts a connector portion 132 of a second panel 130. Further panels 130 may be joined to each other to form a sign stack 76 if any desired height or configuration. Panels 130 may be added or removed as desired, and of course the display strips 28 and spiral bound pads 78 may be changed easily. The panel 130 has upper channels 138 and lower channels 140 for holding the display strips 28. Although the channels 138 and 140 are shown configured for the flat display strips 28, the panel 130 may instead be configured to hold the spiral bound pads 78. The panel 130 maybe provided in different sizes to hold display strips or spiral bound pads of different heights.

FIG. 9 shows a second alternative embodiment of a panel 142. The panel 142 includes a connector portion 144 extending along its upper edge. The connector portion 144 of the illustrated embodiment is generally cylindrical and extends along the length of the upper edge of the panel 142. The connector portion 144 is shaped and sized to fit into the C-channel 118 of the mounting strip 112. Like the panel 130, the second alternative panel 142 include a C-channel 146 into which a connector portion 144 of another panel may be inserted. The C-channel 146 may be of the generally the same size and shape as the channel 118. The panel 142 also has upper and lower channels 148 and 150 for holding display strips and/or spiral bound pads.

A third alternative embodiment of a panel 152 is shown in FIG. 10. The panel 152 is similar to those described above except that a connector portion 154 is of generally a T shape. The T-shaped connector portion 154 is sized and shaped to fit into the channel 118 of the mounting strip 112. The connector portion 154 is slid into the channel 118 to join the panel 152 to the mounting strip and slid out of the channel 118 to remove the panel 152. The panel 152 includes a C-channel 156 that accepts a connector portion 154 from a second panel 152. The panel 152 has upper and lower channels 158 and 160 for holding display strips 28 or spiral bound pad 78.

A fourth alternative embodiment of a panel 162 has a connector 164 along its top edge. The connector 164 is of a roof shape or arrow shape that is of a size and shape to fit into the channel 118 of the mounting strip 112. The connector 164 is configured to be slid in from the end of the channel 118 and slid out of the channel when the panel 162 is to be removed. In certain embodiments, the connector 164 may be sufficiently flexible to fit into the channel 118 by pushing the connector 164 into the slot 122. Other embodiments may have a more rigid connector 164 or other flexible shapes. The panel 162 has a C-channel 166 extending along its lower edge. The C-channel 166 may be of generally the same size and shape as the channel 118 and is shaped to receive a connector 164 of a second panel 162. Upper and lower channels 168 and 170 are provided for holding display strips 28 or spiral bound pads 78.

A fifth alternative embodiment of a panel 172 has a connector 174 for connection into the channel 118. The connector 174 is in a shape of an upwardly directed trough extending along the edge of the panel 172. The panel 172 has a C-channel 176 extending along the bottom edge that is shaped to receive a connector 174 of a second panel 172. Upper and lower channels 176 and 178 are provided to hold display strips and spiral bound pads.

The alternative embodiments show only some of the examples of connectors that may be provided for a modular panel sign system. Other connectors are possible and within the scope of this invention.

A system and method is provided for the direct/flush mounting of a sign at a ceiling, window, or wall that includes modular panels that are removably connected to one another to form a sign board stack. The sign board stack is mounted or unmounted from a prominent display location using a pole end gripper. The sign board stack extends from a mounting strip having a holder at which the sign board stack is fastened, and the pole end gripper engages the mounting strip at an offset grasping portion disposed laterally of the holder. The mounting strip has magnets on a top surface for magnetically engaging a ceiling grid. The panels have flanges at the top edge to fit into the holder of the mounting strip and clips at the bottom edge to hold a flange of a panel connected below it. Channel tracks are formed on the panels to hold strip sign elements, some of which may include accordion or spiral bound numbers, pads or messages.

Thus, there is shown and described a modular sign system that permits the user to configure, customize and change the number and positions of the sign holding channels in the sign board stack. The modular sign system may be directly flush mounted to a ceiling or other mounting location without the use of a ladder or the user otherwise climbing to reach the designed sign hanging location. The sign system may be provided in environments with low ceiling heights while providing additional head clearance, clear lines of sight for shoplifting prevention, and additional advertising space. The sign system may be used in stores and other facilities having ceiling heights as low as eight or nine feet and no additional sign hanging hardware would be required. At least an extra inch of head clearance or additional advertising space is provided by the offset flush mounting strip. Not only may the information in the sign be changed easily, safely and frequently, if desired, but the configuration of the sign holder itself may be readily changed.

Although other modifications and changes may be suggested by those skilled in the art, it is the intention of the inventor to embody within the patent warranted hereon all changes and modifications as reasonably and properly come within the scope of his contribution to the art.

I claim:

1. A track channel system for a sign, comprising:
   - a mounting strip having a connector for connection to a mounting location, the mounting strip being configured for removable mounting flush to a ceiling or window or wall using a gripper for mounting and removing the mounting strip, the mounting strip including a holder; and
   - a panel having a channel track for receiving a display strip, the panel including a first portion along a first edge, the first portion being removably connected to the holder of the mounting strip, the panel being mounted flush to the mounting strip when the first portion is connected to the holder, the panel including a clip along a second edge that is opposite the first edge, the clip having a shape to connect to a first portion of further panel, wherein the first portion of the further panel is generally of a same shape as the first portion of the panel;

wherein the mounting strip is configured for mounting to the ceiling or window or wall without a gap between the mounting strip and the panel, wherein the holder of the mounting strip defines at least one hole extending through the holder;

wherein the first portion of the panel defining at least one hole disposed for positioning in registration with the at least one hole through the holder; and a pin inserted through the at least one hole through the holder and through the at least one hole in the first portion when the first portion is in the holder, the pin securing the mounting strip to the panel.

2. A track channel system as claimed in claim 1, wherein the first portion of the panel is a flange, and wherein the clip is shaped to connect to a flange.

3. A track channel system for a sign, comprising:

a mounting strip having a connector for connection to a mounting location, the mounting strip being configured for removable mounting flush to a ceiling or window or wall using a gripper for mounting and removing the mounting strip, the mounting strip including a holder; and a panel having a channel track for receiving a display strip, the panel including a first portion along a first edge, the first portion being removably connected to the holder of the mounting strip, the panel being mounted flush to the mounting strip when the first portion is connected to the holder, the panel including a clip along a second edge that is opposite the first edge, the clip having a shape to connect to a first portion of further panel, wherein the first portion of the further panel is generally of a same shape as the first portion of the panel;

wherein the mounting strip is configured for mounting to the ceiling or window or wall without a gap between the mounting strip and the panel, wherein the first portion of the panel is a flange, and wherein the clip is shaped to connect to a flange, wherein the clip includes two strips defining a space between the two strips, the space being shaped to receive the flange by inserting the flange into the space from perpendicular to the mounting strip;

wherein the flange and the two strips each defining first and second openings that are positionable in registration; and first and second pins inserted into respective ones of the first and second openings to secure the panel to the mounting strip.

4. A track channel system as claimed in claim 1, wherein the holder includes a channel defining an slot extending along a side opposite the connector;

wherein the first portion is shaped to fit into the channel with the channel track extending outside of the channel at the slot.

5. A track channel system as claimed in claim 4, wherein the clip along the second edge of the panel includes a channel having a slot extending along a side opposite the channel track.

6. A track channel system as claimed in claim 1, wherein the panel is a first panel and further comprising:

a second panel having a channel track for receiving a display strip, the second panel including a first portion along a first edge and a clip along a second opposite edge, the first portion of the second panel being connected to the clip of the first panel, the second panel being generally co-planar with the first panel.

7. A track channel system as claimed in claim 6, wherein the channel track of one of the first and second panels is configured to hold generally flat display strips, and wherein the channel track of the other of the first and second panels is configured to hold spiral bound display pads.

8. A track channel system as claimed in claim 6, further comprising:

a third panel having a channel track for receiving a display strip, the third panel including a first portion along a first edge and a clip along a second opposite edge, the first portion of the third panel being connected to the clip of the second panel, the third panel being generally co-planar with the first and second panels.

9. A track channel system as claimed in claim 1, wherein the mounting strip includes an offset grasping portion by which the mounting strip may be gripped by a gripper without also gripping the holder or the connector.

10. A track channel system as claimed in claim 1, wherein the connector includes a plurality of magnets mounted on the mounting strip.

11. A track channel system as claimed in claim 1, wherein the holder of the mounting strip includes first and second wall portions defining a capture space between the first and second wall portions and a plurality of fins extending inwardly from the first and second wall portions.

12. A track channel system for a sign, comprising:

a pole;

a gripper mounted at an end of the pole, the gripper having a selectively operable gripping portion;

a mounting strip having a grasping portion shaped to be grasped by the gripper, the mounting strip including a connector and an elongated holder, the grasping portion being offset from the connector and the elongated holder, the elongated holder defining an elongated holding space, the mounting strip being configured for mounting flush to and unmounting from a ceiling or wall or window using the pole and gripper without use of a ladder;

a first panel having a planar portion and first and second channels spaced from one another on the planar portion to define a first channel track, the first channel track being configured to receive a display strip, the first panel having a first portion extending along an edge generally parallel with the first channel track, the first portion being removably received in the elongated holding space of the elongated holder without a gap between the mounting strip and the first panel, the first panel having an elongated clip at an edge that is opposite the first portion, the elongated clip extending generally parallel with the first channel track and defining an elongated receiving space; and a second panel having a planar portion and first and second channels spaced from one another on the planar portion to define a second channel track, the second channel track being configured to receive a display strip, the second panel having a first portion extending along an edge generally parallel with the second channel track, the first portion being removably received in the elongated receiving space of the first panel, the second panel having an elongated clip at an edge that is opposite the first portion, the elongated clip extending generally parallel with the second channel track and defining an elongated receiving space;

wherein the elongated holder of the mounting strip defines at least one hole extending through the elongated holder;

wherein the first portion of the first panel defines at least one hole disposed for positioning in registration with the at least one hole through the elongated holder; and a pin inserted through the at least one hole through the elongated holder and through the at least one hole in the first portion of the first panel when the first portion is in the elongated holder, the pin securing the mounting strip to the first panel.

13. A track channel system for a sign, comprising:

a pole;

a gripper mounted at an end of the pole, the gripper having a selectively operable gripping portion;

a mounting strip having a grasping portion shaped to be grasped by the gripper, the mounting strip including a connector and an elongated holder, the grasping portion being offset from the connector and the elongated holder, the elongated holder defining an elongated holding space, the mounting strip being configured for mounting flush to and unmounting from a ceiling using the pole and gripper without use of a ladder;

a first panel having a planar portion and first and second channels spaced from one another on the planar portion to define a first channel track, the first channel track being configured to receive a display strip, the first panel having a first portion extending along an edge generally parallel with the first channel track, the first portion being removably received in the elongated holding space of the elongated holder, the first panel having an elongated clip at an edge that is opposite the first portion, the elongated clip extending generally parallel with the first channel track and defining an elongated receiving space;

a second panel having a planar portion and first and second channels spaced from one another on the planar portion to define a second channel track, the second channel track being configured to receive a display strip, the second panel having a first portion extending along an edge generally parallel with the second channel track, the first portion being removably received in the elongated receiving space of the first panel, the second panel having an elongated clip at an edge that is opposite the first portion, the elongated clip extending generally parallel with the second channel track and defining an elongated receiving space;

wherein the grasping portion of the mounting strip includes a projection configured for engagement by the gripper, the projection including or being adjacent to at least one friction increasing strip disposed for engagement by the gripper.

* * * * *